United States Patent
Beck

(10) Patent No.: US 11,248,644 B2
(45) Date of Patent: Feb. 15, 2022

(54) NAIL SCREW

(71) Applicant: Raimund Beck Nageltechnik GmbH, Mauerkirchen (AT)

(72) Inventor: Christian Beck, Burghausen (DE)

(73) Assignee: Raimund Beck Nageltchnik GmbH, Mauerkirchen (AT)

( * ) Notice: Subject to any disclaimer, the term of this patent is extended or adjusted under 35 U.S.C. 154(b) by 249 days.

(21) Appl. No.: 16/577,210

(22) Filed: Sep. 20, 2019

(65) Prior Publication Data

US 2021/0088070 A1    Mar. 25, 2021

(51) Int. Cl.
*F16B 25/00* (2006.01)
*F16B 25/10* (2006.01)

(52) U.S. Cl.
CPC ........ *F16B 25/106* (2013.01); *F16B 25/0015* (2013.01); *F16B 25/0068* (2013.01); *F16B 25/0073* (2013.01)

(58) Field of Classification Search
CPC ............... F16B 25/106; F16B 25/0015; F16B 25/0068; F16B 25/0073
USPC .................................. 411/394, 412, 453, 425
See application file for complete search history.

(56) References Cited

U.S. PATENT DOCUMENTS

| 8,121 A | * | 3/1878 | Fetter | F16B 25/0047 411/412 |
| 338,956 A | * | 3/1886 | Hall | |
| 1,593,986 A | * | 7/1926 | Poirier | F16B 13/066 411/44 |
| 3,865,006 A | * | 2/1975 | Massoney | F16B 33/02 411/394 |
| 5,190,424 A | * | 3/1993 | Kazino | F16B 33/02 411/171 |
| 5,927,035 A | * | 7/1999 | Haytayan | F16B 19/02 52/483.1 |
| 5,947,670 A | * | 9/1999 | Larson | F16B 25/0031 411/387.5 |
| 6,185,896 B1 | * | 2/2001 | Roberts | F16B 25/0047 52/537 |
| 6,322,307 B1 | * | 11/2001 | Glover | F16B 25/0047 411/412 |
| 6,428,258 B1 | * | 8/2002 | Osterle | F16B 25/10 411/386 |
| 6,808,120 B2 | * | 10/2004 | Oram | E01B 9/06 238/366 |
| 8,430,619 B2 | * | 4/2013 | Olsen | F16B 25/00 411/412 |

(Continued)

*Primary Examiner* — Gary W Estremsky
(74) *Attorney, Agent, or Firm* — Berenato & White, LLC

(57) ABSTRACT

A nail screw, in particular for connecting facade boards or terrace planks made of wood, especially real wood, has a shaft, a conical tip formed at the front end region of the shaft and a head formed at the rear end region of the shaft. A thread has a forward facing insertion flank and a rearward facing grip flank between the conical tip and the head. The thread is a double thread, wherein a grip flank angle (α) measured between the grip flank and a plane perpendicular to the longitudinal axis of the nail screw is between 25 and 35 degrees, more preferably between 28 and 32 degrees, most preferably 30 degrees. The conical tip has a tip angle (ε) between 80 and 120 degrees, more preferably between 90 and 110 degrees, most preferably of 80, 90 or 100 degrees.

24 Claims, 2 Drawing Sheets

(56) References Cited

U.S. PATENT DOCUMENTS 8,864,431 B2 * 10/2014 Su ...................... F16B 25/0068
411/387.1
10,197,085 B1   2/2019  Litzinger

* cited by examiner

NAIL SCREW

FIELD OF THE INVENTION

The present invention relates to a nail screw, in particular for connecting facade boards or terrace planks made of wood, especially real wood, having a shaft, a conical tip formed at the front end region of the shaft and a head formed at the rear end region of the shaft, wherein a thread having a forward facing insertion flank and a rearward facing grip flank is provided on the shaft between the conical tip and the head.

BACKGROUND OF THE INVENTION

When it comes to joining components together, nails or screws are often used. A great advantage of nail connection is that they can be produced relatively quickly compared to screw connections. Screw connections, on the other hand, are relatively easy to unscrew compared to nail connections.

Nail screws that combine the advantages of screws and nails have been available for some time now. Such nail screws can be driven into components to be connected by means of an automatic nail gun. The position of nail screws driven into the components can then be adjusted by means of a screwdriver. Likewise, the nail screws can be unscrewed from the components by means of a screwdriver.

A nail screw of the type mentioned above is known from U.S. Pat. No. 10,197,085 B1, which describes a nail screw having a shaft, a conical tip formed at the front end region of the shaft and a head formed at the rear end region of the shaft. A single threaded thread having a forward facing insertion flank and a rearward facing grip flank is provided on the shaft between the conical tip and the head. A grip flank angle measured between the grip flank and a plane perpendicular to the longitudinal axis of the nail screw is between 38 and 42 degrees and an insertion flank angle measured between the insertion flank and a plane perpendicular to the longitudinal axis of the nail screw is between 68 and 72 degrees. Thus, a thread profile angle measured between the insertion flank and the grip flank is between 105 and 115 degrees. The conical tip has a tip angle between 23 and 33 degrees.

The known nail screws have the disadvantage that when they are driven into wood, especially real wood, the wood splits undesirably.

SUMMARY OF THE INVENTION

It is the object of the present invention to provide an alternatively designed nail screw of the type mentioned above.

This object is achieved according to the invention with a nail screw of the above mentioned kind which is characterized in that the thread is a double thread, wherein a grip flank angle measured between the grip flank and a plane perpendicular to the longitudinal axis of the nail screw is between 25 and 35 degrees, more preferably between 28 and 32 degrees, most preferably 30 degrees, and that the conical tip has a tip angle between 80 and 120 degrees, more preferably between 90 and 110 degrees, most preferably of 80, 90 or 100 degrees.

This special design of the nail screw causes the springback caused by material displacement when the nail screw is driven into a material and thus the pullout force of the nail screw to be increased as compared to the prior art nail screw. In addition, the inventive choice of the tip angle, more precisely a relatively blunt tip, prevents a splitting of the wood into which the nail screw is driven and thus leads to an improved optical appearance of a connection point as compared to the prior art nail screw. Furthermore, the double thread which can also be called a two-start thread results in a greater axial movement during one revolution as compared to a single threaded thread and thus the nail screw can be faster unscrewed from connected components.

According to an embodiment of the invention, an insertion flank angle measured between the insertion flank and a plane perpendicular to the longitudinal axis of the nail screw is between 65 and 75 degrees, more preferably between 68 and 72 degrees, most preferably 70 degrees.

A thread profile angle measured between the insertion flank and the grip flank of the double thread may be between 90 and 110 degrees, more preferably between 95 and 105 degrees, most preferably 100 degrees.

The two thread flanks may converge as the radial distance to the longitudinal axis of the nail screw increases to an edge whose width measured in the longitudinal direction of the nail screw is not more than 0.3 mm.

In order to enable particularly smooth-running and simple unscrewing of the nail screw from components to be connected, in one exemplary embodiment the double thread has self-cutting thread flanks.

It is also possible that the pitch of the double thread is equal to or at least substantially equal to the outer diameter of the double thread. The pitch and/or the outer diameter of the double thread may be between 3.1 and 3.3 mm, preferably 3.15 mm, 3.20 mm or 3.25 mm. The core diameter of the nail screw may be between 2.55 and 2.65 mm.

According to another embodiment of the invention, a threaded shaft portion having the double thread directly adjoins to the conical tip and an unthreaded shaft portion is formed between the threaded shaft portion and the head. The threaded shaft portion may have a length between 30 and 35 mm, preferably of 30 mm, 31 mm, 34 mm or 35 mm, and/or the unthreaded shaft portion may have a length between 18 and 37 mm, in particular between 18.9 and 35.9 mm, preferably of 18.9 mm or 35.9 mm.

The nail screw may have an overall length between 50 and 80 mm, in particular between 53 and 75 mm, preferably of 53 mm, 57 mm or 75 mm.

BRIEF DESCRIPTION OF THE FIGURES

Further features and advantages of the present invention will become clear by the following description of an embodiment of a nail screw according to the invention with reference to the enclosed drawing. In it is.

DETAILED DESCRIPTION OF THE PREFERRED EMBODIMENT(S)

Figure 1:
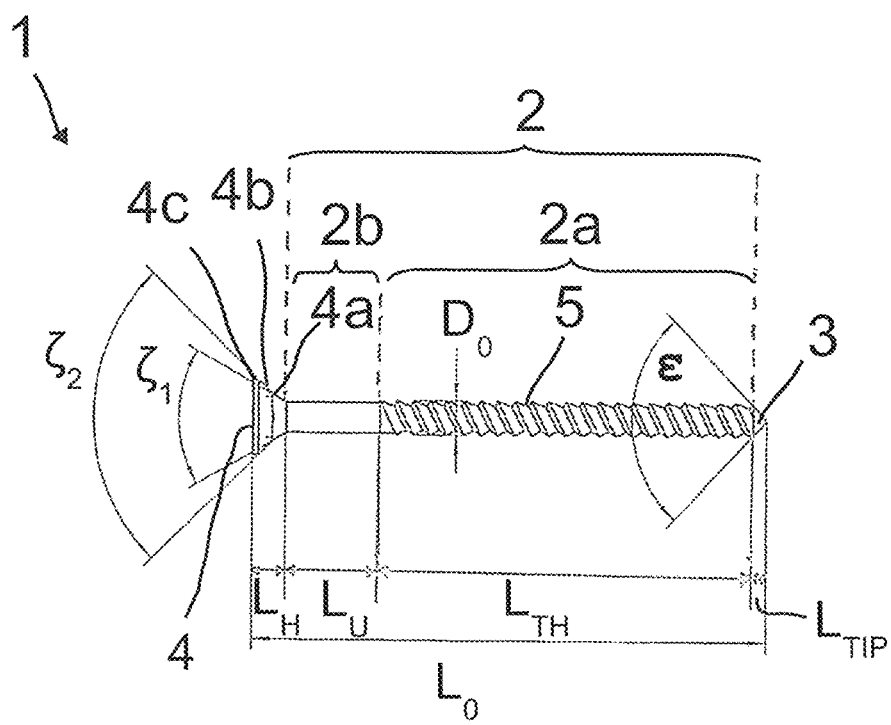
FIG. 1 is a diagrammatic illustration of a nail screw according to the invention.
Figure 2:
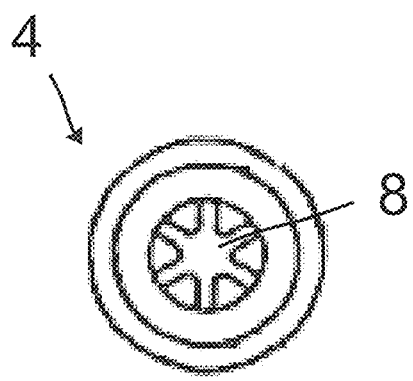
FIG. 2 is a diagrammatic illustration of the nail screw according to FIG. 1 from behind.
Figure 3:
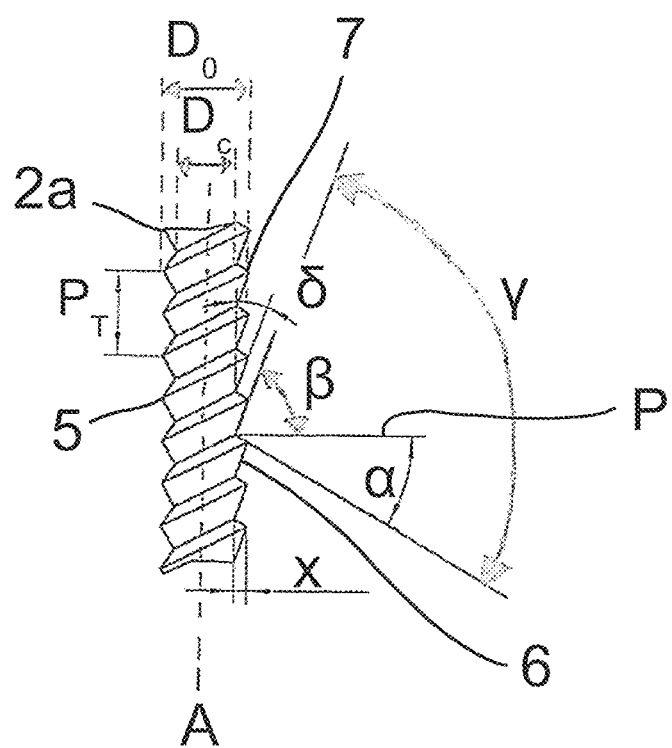
FIG. 3 is a diagrammatic partial illustration of the shaft of the nail screw according to FIG. 1.

FIGS. 1 to 3 show a nail screw 1 for connecting facade boards or terrace planks made of real wood according to the invention. Nail screw 1 has a shaft 2, a conical tip 3 formed at the front end region of the shaft 2 and a head 4 formed at the rear end region of the shaft 2. A double thread 5 having a forward facing insertion flank 6 and a rearward facing grip flank 7 is provided on the shaft 2 between the conical tip 3 and the head 4. More precisely, the shaft 2 consists of a threaded shaft portion 2a which has the thread 5 and directly adjoins to the conical tip 3 and an unthreaded shaft portion 2b which is formed between the threaded shaft portion 2a and the head 4.

A grip flank angle α measured between the grip flank 7 and a plane P perpendicular to the longitudinal axis A of the nail screw 1 is 30 degrees in the present case. Furthermore, an insertion flank angle β measured between the insertion flank 6 and the plane P is 70 degrees in the present case. A resulting thread profile angle γ measured between the insertion flank 6 and the grip flank 7 is thus 100 degrees. Furthermore, an angle δ measured between the insertion flank 6 and the longitudinal axis A of the nail screw 1 is 20 degrees.

In the present example, the conical tip 3 has a tip angle ε of 100 degrees.

The head 4 is of the countersunk head type and comprises a front conical portion 4a, a middle conical portion 4b which directly adjoins to the front conical portion 4a and a rear cylindrical portion 4c which directly adjoins to the middle conical portion 4b. The front conical portion 4a has an opening angle $\zeta_1$ of 60 degrees, whereas the middle conical portion 4b has an opening angle $\zeta_2$ of 90 degrees. The rear cylindrical portion 4c has an outer diameter between 6.8 and 7.1 mm. The head 4 has an outer diameter of 4.4 mm at its axial transition point between the middle conical portion 4b and the front conical portion 4a. Moreover, in the rear cylindrical portion 4c and the middle conical portion 4b of the head 4 a torx recess 8 of the T15 type is provided in order to be able to turn the nail screw 1 with a screwdriver designed to complement the latter. Of course it is also possible to form the recess 8 in form of an internal hexagon, as a cross slot or as a simple slot.

The two thread flanks 6, 7 may converge as the radial distance to the longitudinal axis of the nail screw 1 increases to an edge whose width measured in the longitudinal direction of the nail screw 1 is not more than 0.3 mm. The pitch $P_T$ of the double thread 5 is 3.2 mm and the outer diameter $D_O$ of the double thread 5 is between 3.15 and 3.25 mm. Thus, the pitch $P_T$ is equal or at least substantially equal to the outer diameter $D_O$ of the double thread 5. The core diameter $D_C$ of the nail screw 1 is between 2.55 and 2.65 mm. The difference between half the outer diameter $D_O$ and half the core diameter $D_C$ is 0.3 mm.

The rear cylindrical portion 4c of the head 4 has an axial length of 0.5 mm. The middle conical portion 4b and the front conical portion 4a of the head 4 each have an axial length of 1.3 mm. Thus, the nail screw head 4 has an axial total length $L_H$ of 3.1 mm. The unthreaded shaft portion 2b has an axial length $L_U$ of 18.9 mm, the threaded shaft portion 2a has an axial length $L_{TH}$ of 30.0 mm and the nail screw tip 3 has an axial length $L_{TIP}$ of 1.0 mm. The nail screw 1 has thus an overall length $L_O$ of 53.0 mm.

The nail screw 1 can be driven into components to be connected by means of an automatic nail gun. The position of the nail screw 1 driven into the components can then be adjusted by means of a screwdriver. Likewise, the nail screw 1 can be unscrewed from the components by means of the screwdriver. Neither the nail gun, nor the screwdriver nor the components are illustrated.

The exact values given in the above example, such as angles α, β, γ, δ, ε and ζ, can optionally be adapted to the different areas of application, in particular to the different types of material to be connected, and therefore are to be considered here as just one possible embodiment, and so not as restrictive.

REFERENCE SIGN LIST 1 nail screw
2 shaft
2a threaded shaft portion
2b unthreaded shaft portion
3 tip
4 head
4a front conical portion
4b middle conical portion
4c rear cylindrical portion
5 thread
6 insertion flank
7 grip flank
8 recess
A longitudinal axis
$D_O$ outer diameter of thread
$D_C$ core diameter
$L_{TH}$ length of threaded shaft portion
$L_U$ length of unthreaded shaft portion
$L_H$ length of head
$L_{TIP}$ length of tip
$L_O$ overall length
P plane
$P_T$ pitch
x half outer diameter minus half core diameter
α grip flange angle
β insertion flank angle
γ thread profile angle
δ angle between insertion flank and longitudinal axis
ε tip angle
$\zeta_1$, $\zeta_2$ opening angle

I claim:

1. A nail screw (1) including:
   a shaft (2);
   a conical tip (3) formed at a front end region of the shaft (2); and
   a head (4) formed at a rear end region of the shaft (2),
   wherein a thread (5) extends on the shaft (2) between the conical tip (3) and the head (4),
   wherein the thread (5) has a forward facing insertion flank (6) and a rearward facing grip flank (7),
   wherein the thread (5) is a double thread,
   wherein a grip flank angle (α) measured between the grip flank (7) and a plane (P) perpendicular to a longitudinal axis (A) of the nail screw (1) is between 25 and 35 degrees, and
   wherein the conical tip (3) has a tip angle (ε) between 80 and 120 degrees.

2. The nail screw (1) according to claim 1, wherein an insertion flank angle ((3) measured between the insertion flank (6) and a plane (P) perpendicular to the longitudinal axis (A) of the nail screw (1) is between 65 and 75 degrees.

3. The nail screw (1) according to claim 1, wherein a thread profile angle (γ) measured between the insertion flank (6) and the grip flank (7) of the double thread (5) is between 90 and 110 degrees.

4. The nail screw (1) according to claim 1, wherein the insertion flank (6) and the grip flank (7) of the double thread (5) are self-cutting thread flanks (6, 7).

5. The nail screw (1) according to claim 1, wherein a pitch ($P_T$) of the double thread (5) is equal to an outer diameter ($D_O$) of the double thread (5).

6. The nail screw (1) according to claim 1, wherein a pitch ($P_T$) and/or an outer diameter ($D_O$) of the double thread (5) is between 3.1 and 3.3 mm.

7. The nail screw (1) according to claim 1, wherein a threaded shaft portion (2a) having the double thread (5) directly adjoins to the conical tip (3), and wherein an unthreaded shaft portion (2b) is formed between the threaded shaft portion (2a) and the head (4).

8. The nail screw (1) according to claim 7, wherein the threaded shaft portion (2a) has a length (LT) between 30 and 35 mm, and/or the unthreaded shaft portion (2b) has a length ($L_U$) between 18 and 37 mm.

9. The nail screw (1) according to claim 1, wherein the nail screw (1) has an overall length ($L_O$) between 50 and 80 mm.

10. The nail screw (1) according to claim 2, wherein a thread profile angle ($\gamma$) measured between the insertion flank (6) and the grip flank (7) of the double thread (5) is between 90 and 110 degrees.

11. The nail screw (1) according to claim 2, wherein the insertion flank (6) and the grip flank (7) of the double thread (5) are self-cutting thread flanks (6, 7).

12. The nail screw (1) according to claim 3, wherein the insertion flank (6) and the grip flank (7) of the double thread (5) are self-cutting thread flanks (6, 7).

13. The nail screw (1) according to claim 2, wherein a pitch ($P_T$) of the double thread (5) is equal to an outer diameter ($D_O$) of the double thread (5).

14. The nail screw (1) according to claim 3, wherein a pitch ($P_T$) of the double thread (5) is equal to an outer diameter ($D_O$) of the double thread (5).

15. The nail screw (1) according to claim 4, wherein a pitch ($P_T$) of the double thread (5) is equal to an outer diameter ($D_O$) of the double thread (5).

16. The nail screw (1) according to claim 2, wherein a threaded shaft portion (2a) having the double thread (5) directly adjoins to the conical tip (3), and wherein an unthreaded shaft portion (2b) is formed between the threaded shaft portion (2a) and the head (4).

17. The nail screw (1) according to claim 3, wherein a threaded shaft portion (2a) having the double thread (5) directly adjoins to the conical tip (3), and wherein an unthreaded shaft portion (2b) is formed between the threaded shaft portion (2a) and the head (4).

18. The nail screw (1) according to claim 4, wherein a threaded shaft portion (2a) having the double thread (5) directly adjoins to the conical tip (3), and wherein an unthreaded shaft portion (2b) is formed between the threaded shaft portion (2a) and the head (4).

19. The nail screw (1) according to claim 5, wherein a threaded shaft portion (2a) having the double thread (5) directly adjoins to the conical tip (3), and wherein an unthreaded shaft portion (2b) is formed between the threaded shaft portion (2a) and the head (4).

20. The nail screw (1) according to claim 6, wherein a threaded shaft portion (2a) having the double thread (5) directly adjoins to the conical tip (3), and wherein an unthreaded shaft portion (2b) is formed between the threaded shaft portion (2a) and the head (4).

21. The nail screw (1) according to claim 1, wherein the grip flank angle ($\alpha$) is between 28 and 32 degrees.

22. The nail screw (1) according to claim 21, wherein the grip flank angle ($\alpha$) is 30 degrees.

23. The nail screw (1) according to claim 1, wherein the conical tip (3) has a tip angle ($\epsilon$) between 90 and 110 degrees.

24. The nail screw (1) according to claim 2, wherein the insertion flank angle ($\beta$) is between 68 and 72 degrees.

* * * * *